United States Patent
Shaw (10) Patent No.: US 10,207,405 B2
(45) Date of Patent: Feb. 19, 2019

(54) METHODS FOR SPONTANEOUSLY GENERATING BEHAVIOR IN TWO AND THREE-DIMENSIONAL IMAGES AND MECHANICAL ROBOTS, AND OF LINKING THIS BEHAVIOR TO THAT OF HUMAN USERS

(71) Applicant: Christopher Deane Shaw, Watertown, MA (US)

(72) Inventor: Christopher Deane Shaw, Watertown, MA (US)

( * ) Notice: Subject to any disclaimer, the term of this patent is extended or adjusted under 35 U.S.C. 154(b) by 0 days.

(21) Appl. No.: 14/603,094

(22) Filed: Jan. 22, 2015

(65) Prior Publication Data
US 2015/0279077 A1  Oct. 1, 2015

Related U.S. Application Data

(60) Provisional application No. 61/930,657, filed on Mar. 31, 2014.

(51) Int. Cl.
| | |
|---|---|
| G06F 19/00 | (2018.01) |
| B25J 9/16 | (2006.01) |
| A63F 13/60 | (2014.01) |
| A63F 13/56 | (2014.01) |
| G05B 19/00 | (2006.01) |

(52) U.S. Cl.
CPC ............ *B25J 9/1633* (2013.01); *A63F 13/56* (2014.09); *A63F 13/60* (2014.09); *B25J 9/1679* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,676,551 | A | * | 10/1997 | Knight | .................. A63F 13/005 434/236 |
| 5,880,731 | A | * | 3/1999 | Liles | ................... H04L 12/1827 345/473 |
| 5,977,968 | A | * | 11/1999 | Le Blanc | .............. G06F 3/0481 463/31 |
| 5,987,415 | A | * | 11/1999 | Breese | .................... G10L 17/26 704/270 |
| 6,147,692 | A | * | 11/2000 | Shaw | ...................... G06T 13/40 345/643 |
| 6,230,111 | B1 | * | 5/2001 | Mizokawa | ............. G06N 3/004 345/473 |

(Continued)

*Primary Examiner* — Bhavesh V Amin

(57) ABSTRACT

The spontaneous animation methods disclosed herein generate apparent emotions and apparent willful actions in artificial characters using mathematical formulae. Because these animations are spontaneously calculated, they are precisely tailored to interactive input. This is in contrast to current methods for creating interactive characters, in which the computer selects among predetermined animation sequences to approximate an appropriate reaction.

In addition to spontaneously generating emotional states and actions, this method is further capable of spontaneously evolving a progression of emotive states and actions, thereby simulating an evolving emotional relationship and/or creating extended interactive sequences with a plot-like structure.

Because spontaneous animation replaces stored behaviors with realtime calculations, it can require thousands of times less data than animation methods currently used in animation and gaming.

2 Claims, 4 Drawing Sheets

(56) References Cited

U.S. PATENT DOCUMENTS

| | | | | |
|---|---|---|---|---|
| 6,249,780 B1* | 6/2001 | Mizokawa | G05B 19/042 | 706/11 |
| 6,268,872 B1* | 7/2001 | Matsuda | A63F 13/12 | 345/473 |
| 6,285,380 B1* | 9/2001 | Perlin | G06N 3/004 | 345/473 |
| 6,320,583 B1* | 11/2001 | Shaw | G06T 13/40 | 345/619 |
| 6,526,395 B1* | 2/2003 | Morris | G06N 3/004 | 706/15 |
| 6,545,682 B1* | 4/2003 | Ventrella | G06T 17/00 | 345/473 |
| 6,556,196 B1* | 4/2003 | Blanz | G06K 9/00275 | 345/419 |
| 6,606,096 B2* | 8/2003 | Wang | G06T 17/20 | 345/473 |
| 6,721,706 B1* | 4/2004 | Strubbe | G10L 15/18 | 704/257 |
| 6,728,679 B1* | 4/2004 | Strubbe | G06F 3/011 | 704/270.1 |
| 6,731,307 B1* | 5/2004 | Strubbe | G06N 3/004 | 704/E17.002 |
| 6,766,299 B1* | 7/2004 | Bellomo | G10L 21/06 | 704/235 |
| 6,795,808 B1* | 9/2004 | Strubbe | G06F 17/30702 | 704/270 |
| 7,136,818 B1* | 11/2006 | Cosatto | G10L 15/1807 | 704/270.1 |
| 7,225,129 B2* | 5/2007 | Massaro | G06T 13/205 | 345/473 |
| 7,797,146 B2* | 9/2010 | Harless | G10L 15/26 | 345/473 |
| 7,908,554 B1* | 3/2011 | Blattner | G06Q 10/107 | 715/706 |
| 7,930,676 B1* | 4/2011 | Thomas | G06F 9/44505 | 706/45 |
| 7,944,448 B2* | 5/2011 | Iwamura | G06Q 90/00 | 345/473 |
| 7,984,005 B2* | 7/2011 | Bridges | G06F 17/218 | 704/231 |
| 7,995,717 B2* | 8/2011 | Conway | G10L 15/1822 | 379/265.02 |
| 8,001,067 B2* | 8/2011 | Visel | G06N 3/02 | 706/23 |
| 8,047,915 B2* | 11/2011 | Lyle | A63F 13/12 | 463/31 |
| 8,094,803 B2* | 1/2012 | Danson | G10L 15/1822 | 379/265.02 |
| 8,096,660 B2* | 1/2012 | Vertegaal | G06F 3/011 | 351/209 |
| 8,384,719 B2* | 2/2013 | Reville | A63F 13/10 | 345/473 |
| 2002/0008716 A1* | 1/2002 | Colburn | G06T 13/40 | 715/706 |
| 2002/0067362 A1* | 6/2002 | Agostino Nocera | G06K 9/00248 | 345/473 |
| 2002/0143622 A1* | 10/2002 | Taliercio | G06Q 30/02 | 705/310 |
| 2003/0028383 A1* | 2/2003 | Guerin | G06N 3/004 | 704/275 |
| 2003/0043153 A1* | 3/2003 | Buddemeier | G06T 13/40 | 345/473 |
| 2003/0206170 A1* | 11/2003 | Bickmore | G06T 13/40 | 345/473 |
| 2003/0206171 A1* | 11/2003 | Kim | G06T 11/00 | 345/473 |
| 2004/0038739 A1* | 2/2004 | Wanat | A63F 13/10 | 463/36 |
| 2005/0137015 A1* | 6/2005 | Rogers | A63F 13/12 | 463/42 |
| 2006/0161553 A1* | 7/2006 | Woo | G06F 17/30684 | |
| 2007/0167204 A1* | 7/2007 | Lyle | A63F 13/12 | 463/9 |

* cited by examiner

METHODS FOR SPONTANEOUSLY GENERATING BEHAVIOR IN TWO AND THREE-DIMENSIONAL IMAGES AND MECHANICAL ROBOTS, AND OF LINKING THIS BEHAVIOR TO THAT OF HUMAN USERS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A COMPUTER PROGRAM LISTING COMPACT DISC APPENDIX

The computer program submitted with this disclosure is java script that is called by a fully functional application which runs in HTML5 using webGL. This application presents a 3D graphical character animated solely using mathematical equations.

The code presented here controls the degree to which all parameters controlling character movements and emotions are applied. The particular mechanisms by which these parameters are applied to the character, which are well known in the art, are handled elsewhere in the application's code.

In addition, this java script example contains a full mechanism by which controlling equations can be dynamically linked to a user's behavior, which demonstrates the coupling of oscillators in the mathematical dynamical system of an artificial character, to oscillators in the physical dynamical system of a human user.

BACKGROUND OF THE INVENTION

The present invention pertains to automated methods for the animation of two and three-dimensional images, as well as mechanical robots. More particularly, the present invention relates to methods of mathematically generating the appearance of emotional states and willful actions in the object being animated, including apparent emotional and physical responses of said object to interactive situations.

Methods for transforming two and three-dimensional images are described in my earlier patents U.S. Pat. Nos. 6,147,692 and 6,320,583. These patents pertain to using additive morphs as a method of changing an animated character's appearance to portray emotional states and other behaviors. These patents also disclose the use of mathematical formulae to control these morphs in order to create apparent "moods" or emotional states in the animated character. During these moods, one or more mathematical formulae may autonomously change one or more features of the character with a frequency and amplitude that has been set to reflect the mood being portrayed.

In spite of the fact that the methods revealed in these patents can generate a character's mood, and the fact that the character is moving during these moods, each mood of the character is generated by pre-set parameters. Therefore, interactive methods that transition from one of these pre-set moods to another fall into the general category of Stored Interactivity, as defined below.

We pause now to define two forms of interactivity:

1. Stored Interactivity will refer to methods which create interactivity by storing reactions in memory and programming the computer to select them according to user actions.

2. Calculated Interactivity will refer to methods which create interactivity by calculating responses to user input without resorting to stored responses.

Most interactive games today combine both methods to some degree, using Calculated Interactivity to duplicate the freedom of experience that real life provides, and Stored Interactivity to provide more complex behaviors and game structure.

In current computer games, Calculated Interactivity methods enable game players to freely navigate in virtual worlds by continuously calculating the player's field of view within the virtual world, so any user choice can be precisely accommodated. This precise responsiveness generates an exciting feeling of reality. The overwhelming success of navigational interactivity has led to game characters which function almost entirely as navigational vehicles to orient the user in virtual space.

Non-navigational functionality in game characters is created primarily using Stored Interactivity methods, due to the difficulty of mathematically modeling and spontaneously calculating human behavior. The advantage of using Stored Interactivity is that human writers or animators can script meaningful, articulate character responses. The disadvantage is that Stored Interactivity's 'canned' responses result in a comparatively stilted, limited interactivity in the exact area where freedom and spontaneity are most appreciated and valuable: inter-human communication.

This lack of appeal of non-navigational interactivity favors games which are action-oriented. Even "social" games like Second Life emphasize navigation and utilize characters which are unable to emote realistically, or to speak naturally.

Even efforts to synthesize simple emotive behaviors, such as U.S. Pat. No. 7,333,969—"Apparatus and method for synthesizing emotions based on the human nervous system" rely on Stored Interactivity methods, as revealed when this patent's "emotion generator" functions by "generating an predetermined emotion" and its "emotional behavior generator" functions by "generating at least one emotional behavior through a predetermined physical reaction."

A number of methods, including those revealed in U.S. Pat. Nos. 8,390,680; 7,202,886, and 5,734,794 create emotions and actions in a graphical character or physical robot which are independent of any stored data by having said character or robot imitate a human performer. These procedures are useful when the character is acting as a stand-in, or avatar, for a human controller. However, they do not enable the computer to control characters autonomously.

U.S. Pat. No. 8,909,370 reveals a robotic companion designed to interactively simulate an emotional relationship for uses such as comforting people with severe autism. This robot can autonomously engage in basic emotive behaviors such as "nuzzling." Such basic emotive reactions are closer to those which will be proposed in the current invention. However, this robotic companion's interactions are selected from a set of predetermined behaviors, which make them a form of Stored Interactivity.

A "physics engine" is the name given to code that spontaneously calculates the movement of physical elements like hair and cloth in current computer games. In such simulations, a progressive parenting of physics equations results in movements being passed down a shaft of hair, or a flag, or a dress, in a way that can be both convincing and beautiful. These physics engines bring an element of spontaneity to user interactions with physical objects. The method of this disclosure parallels these physics engines with a Psychology Engine that brings spontaneity to the emotions and behavior of characters.

BRIEF SUMMARY OF THE INVENTION

The purpose of this invention is to bring the freedom and spontaneity of Calculated Interactivity to simulated interpersonal communication. This requires a set of mathematical formulae capable of spontaneously generating human-like behavior.

It is clearly impossible at this time for a computer to duplicate the full breadth of human behavior. Accordingly, the method presented here mathematically models only the most basic behavior patterns. We will refer to these patterns as Physiologically Derived Behaviors, or PDB's. Although they lie outside the more complex "higher" or "rational" contributors to human behavior, Physiologically Derived Behaviors have an overall effect on our behavior that is arguably stronger than the more vaunted aspects of humanity. The profundity and interrelated action of PDB's is observed when a human subject is under the influence of a drug.

When a human subject is under the influence of a strong stimulant or depressant, the effect of the drug in question can be observed in the subject's physical movements, their speech patterns, their conscious and subconscious thoughts, as well as their digestion, heartbeat and other anatomic functions. Furthermore, these separate effects on all these highly diverse systems all exhibit a marked similarity in their observable patterns (e.g. fast, erratic heartbeat; fast, erratic thought processes; fast, erratic body movements). These broad-based, underlying behavior patterns appear not only under the blatant effects of powerful drugs, but also in response to much gentler drugs like coffee, and—more importantly for our purposes—in response to the emotional state of the human character being observed or modeled: These broadly influential underlying behavior patterns are what the method of this patent defines as PDB's, and what this method's psychology engine is designed to spontaneously duplicate.

DETAILED DESCRIPTION OF THE INVENTION

The example code presented in the appendix of this disclosure spontaneously animates the behavior of a pre-verbal infant. An infant was chosen because its behavior represents the purest and simplest functioning of the Physiologically Derived Behaviors that our Psychology Engine models. The general method of the invention is detailed below with references to the specific infant example as illustration. The description below is broken into steps for logical clarity, so that each explanation builds on information revealed in preceding steps. In actual practice of the method of this invention, the order of these steps may be changed, or they may be performed concurrently, as long as the interconnection of the functionalities described in stepwise fashion below remains intact.

Step #1—Create an Array of PDB Oscillators.

This example begins by setting up an array of independent mathematical formulae, including equations capable of generating parametrically adjustable oscillations. These equations may be capable of specifying changes in a system over time in response to forces, or force-like factors, in the manner of the dynamics branch of physics. These formula will be used to mimic the artificial character's Physiologically Derived Behaviors, including emotional factors, body movements, and physiological processes. Oscillators are chosen because the Physiologically Derived Behaviors we are modeling tend to cycle and dwell within a certain range.

It is tempting to use more sophisticated mathematical formula which are independently able to generate complex behavior—such as chaotic attractors—to model physiological components. However, for the sake of clarity, this introductory example will present an array consisting of simple damped springs, approximated (and further simplified) with the following mathematical formula:

$$x + = v*dt;$$

$$v + = (k*(\text{target}-x) - d*v)*dt;$$

Figure 1:
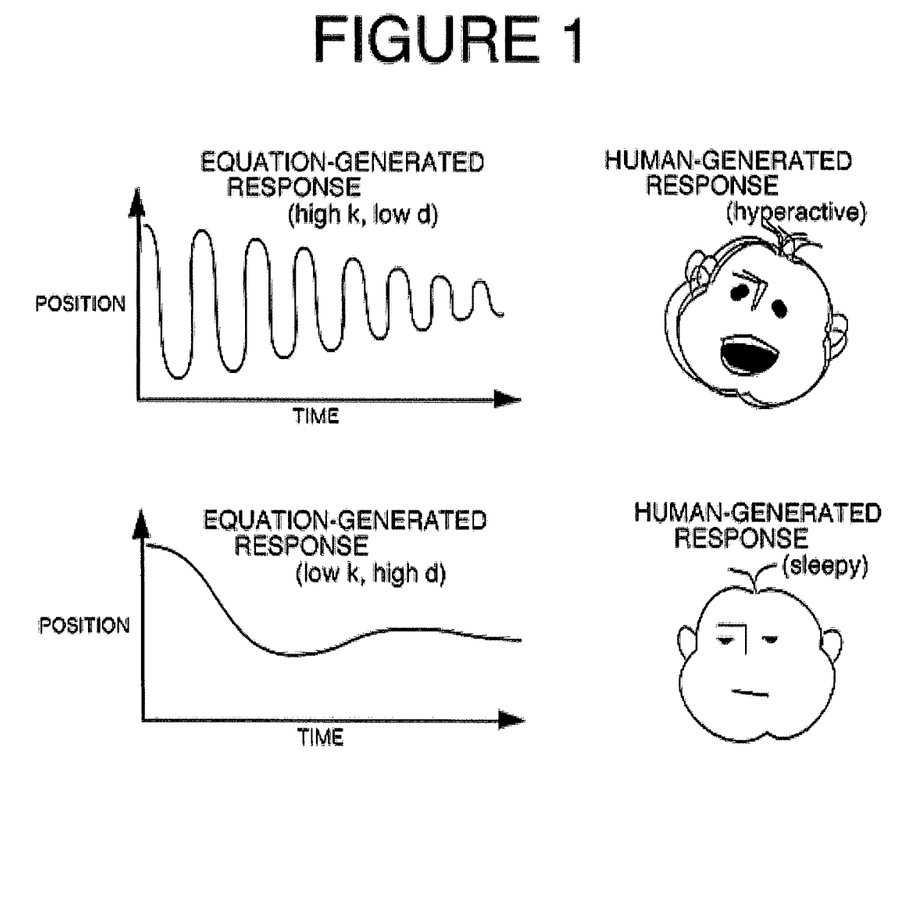
FIG. 1 — The left side of the FIG. 1 presents two graphs demonstrating the difference in output of a mathematical spring formula when the spring constant parameter, k, is relatively high (top left), and the spring's damping parameter, d, is relatively low (bottom left). The heads immediately to the right of each graph are intended to show the differing movements created in an artificial character controlled by the outputs as shown in the corresponding graphs: "hyperactive" movements (top right), and drowsy movements (bottom right).

By adjusting two parameters of these approximations, spring constant, k, and damping d, one can generate crude renditions of the rapid, shaky behaviors of the earlier-mentioned subject on a powerful stimulant (high k, low d), and the sluggish behavior of the subject on a depressant (high d, low k), as well as other combinations the reader can easily imagine. In addition, the transitions between these extreme stales are continuous, allowing every shade of grey, (FIG. 1).

Although extremely basic, these spring approximations have the advantage of being clearly understandable, non-distracting, and—as we will see in the following steps—they can be combined to create complex and nuanced behavior.

Step #2—Link PDB Oscillators to Behavioral Characteristics

The next step in our method is to link these independent component oscillators to separate mechanisms representing components of our artificial character's behavioral state, so that each unique oscillator drives a unique component. Components may include the following:

Facial Expressions—

These can be generated a number of ways, but our particular example uses morph targets—e.g. "smile", "frown", "trusting" vs. "suspicious" eyes (lids shrouding the pupil from the top vs. the bottom), and the often-neglected but highly evocative characteristic of "facial asymmetry". The relative importance and meaning of these separate characteristics can be discussed elsewhere and is easily alterable by future programmers using this method. The salient point here is that the attack, duration and decay of each individual characteristic is determined by a separate mathematical formula.

Body Movements—

Separate body movements (and separate rotational components of a particular body movement) can be assigned to separate oscillators, just as was done with the separate emotional representations above.

Vocal Patterns—

Separate vocal parameters such as pitch, volume, speed, and hat rise (the musical structure of a sentence or phrase) are uniquely assigned to separate oscillators as above.

Respiration—

Breathing is assigned to a separate oscillator. In this case, our example adds a small element of complexity to the simple two-parameter spring approximation to allow the character to go from ventilation to hyperventilation. This modification will be further described in step 4.

Step #3—Link Together the Tuning Parameters of the PDB Oscillators

The goal in this step is to recreate the global uniformity of behavioral patterns that exists across various physiological systems, as noted in our earlier description of PDB behavior of subjects under the influence of a drug or an emotional state. This uniformity is achieved by linking the parameters of the separate PDB oscillators. In the code presented in the appendix of this disclosure, the variable "awake" ranges from 0 (character asleep) to 1 (wide awake). This variable smoothly adjusts the k and d parameters of every PDB, so that all springs become increasingly sluggish (lower k higher d) as "awake" approaches 0. However, the degree to which various PBD oscillators are effected by the "awake" variable differs, so that when awake=0, the character's breathing, although slowed, continues, whereas it's physical movements are shut down.

In an interactive situation, as "awake" decreases and reaches zero, all the details of the character's swoon and its final sleeping position are instantaneously calculated, with no input from any recalled animation. This means that a character's behaviors are always original, and—by linking control variables like "awake" directly to user input—characters can create wholly original responses based entirely on the user's input. The increase in realism achieved by this method's infinitely-variable, absolutely-responsive characters is readily apparent and highly satisfying to users. The interactive linking of users to control variables will be further described in step 5.

Step #4—Couple the Separate PDB Oscillators in the Array

Figure 2:
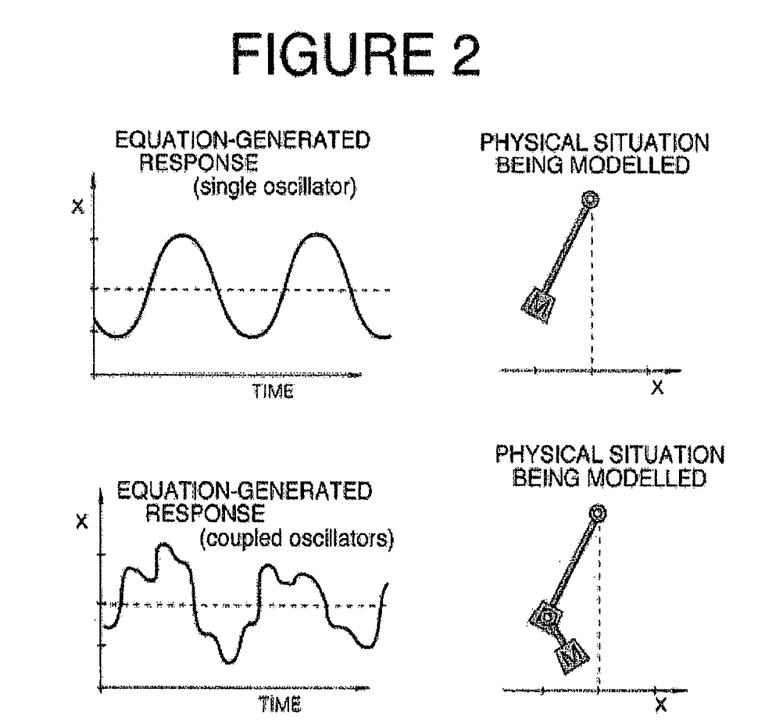
FIG. 2 — The top half of FIG. 2 shows the graph of a mathematical equation's output over time (top left) and the physical situation being modeled (top right) for a single pendulum. The bottom half of FIG. 2 shows the output graph (bottom left) and the physical situation being modeled (bottom right) for a coupled pendulum.

Coupling oscillators—connecting them in such a way that energy can be transferred between them—is a well-studied phenomenon of physics known to produce patterns of behavior that can be highly structured, yet unpredictable. The method disclosed here couples the separate PDB equations of a character to create such patterns in the emotions and physical behavior in the character. The coupling of oscillators can be hierarchical, such as when a second pendulum is attached to the swinging bob of a "parent" pendulum. The method of this disclosure uses such hierarchies to add organization and structure to the separate character attributes controlled by separate PBD's, (FIG. 2).

In the Appendix's code for an interactive infant, the PBD that governs the infant's breathing is the root parent of the other PBD equations. Although we are attempting to keep the formulae in this example as simple as possible, this breathing PBD has been slightly enhanced. The effect of this modification can be simply described by detailing the behavior of the breathing PBD as it responds to its control variable, "excitement."

When excitement=0, the character's breath rate is very slow and rhythmic. As this control is increased toward excitement=1, the breath rate climbs smoothly to a very fast rhythmic pace. At excitement=1, breathing breaks a barrier, similar to that seen when laminar flow becomes turbulent, such that when excitemen>1, the character's previously methodical ventilation becomes hyperventilation, wherein both the depth and the duration of each breath becomes random. This creates an emphatic, gagging output of the breathing PDB, which is used to power both laughing and crying in the character. In both cases the PBD's that govern the motion of the character's head, the openness of the jaw, and other related characteristics are all children of the PBD that governs breathing. The result is that the effects of hyperventilation are passed to these other characteristics. Additionally, in our example the parameters of the affected PBD's can be adjusted so that they either stifle or amplify the original breathing effect. Again, this is all calculated spontaneously, requires zero recalled animations, and generates behavior that is precisely customized to the user, and never repeats.

Another advantage of this hierarchic coupling is that naturalistic transitions tend to spontaneously emerge in the code, such as an overexcited laugh flipping into a cry. These sorts of complex, unexpected, and human-like behaviors emerge because—even though our example relies on a trivially simple mathematical approximations of a damped spring—coupling these approximations creates sophisticated, complex behavior.

As a hierarchical chain of dynamic oscillators grows longer, or becomes otherwise more complex (e.g. wider, like in a cloth simulation), the unpredictability of the position of any particular point tends to increase. Yet, in the overall system, recognizable patterns of motion may emerge in which the frequencies of multiple coupled oscillators resonate in a stable and recognizable manner. These stable patterns of motion are seen, for example, in the emergence of visible patterns on the surface of water in response to varying sound waves, and in numerous formal experiments including Swinney and Gollub's study of the emergence of highly structured chaotic patterns Taylor-Couette flow.

When dynamically-linked equations are used to drive emotional and behavioral components of an artificial character, these sorts of stable and recognizable patterns of motion become analogous to moods or emotional states—emerging spontaneously, enduring in a mutable form: and then disappearing under changing conditions, as they do in life.

Step #5—Enable Interactivity

We have created a character with emotional states derived from a tuned system of interconnected oscillators. Our next step is to create an interactive scenario—or virtual relationship between the character and the human user. To do this, we must link our character's artificial emotional state to the emotional state of the user.

This requires an interface capable of transmitting emotions from the user. Recent technologies provide a plethora of opportunities to input user emotions, including combining the now-prevalent user-facing camera with facial recognition software to analyze facial expressions. Such interfaces provide excellent data on the user's particular expression at any time. In fact, a number of recent researchers claim to have developed software that can surpass a human in analyzing facial emotions.

The method disclosed here differs from that approach in that it focuses on the kinetic elements of emotion and body language rather than analyzing endpoints. For example, by focusing on kinetic elements like the attack and decay of a smile, rather than it's exact shape, the method disclosed here can classify a face that smiles slowly, then very quickly returns to neutral (nervous), as different than a face that that smiles quickly, then very slowly returns to neutral (relaxed).

Figure 3:
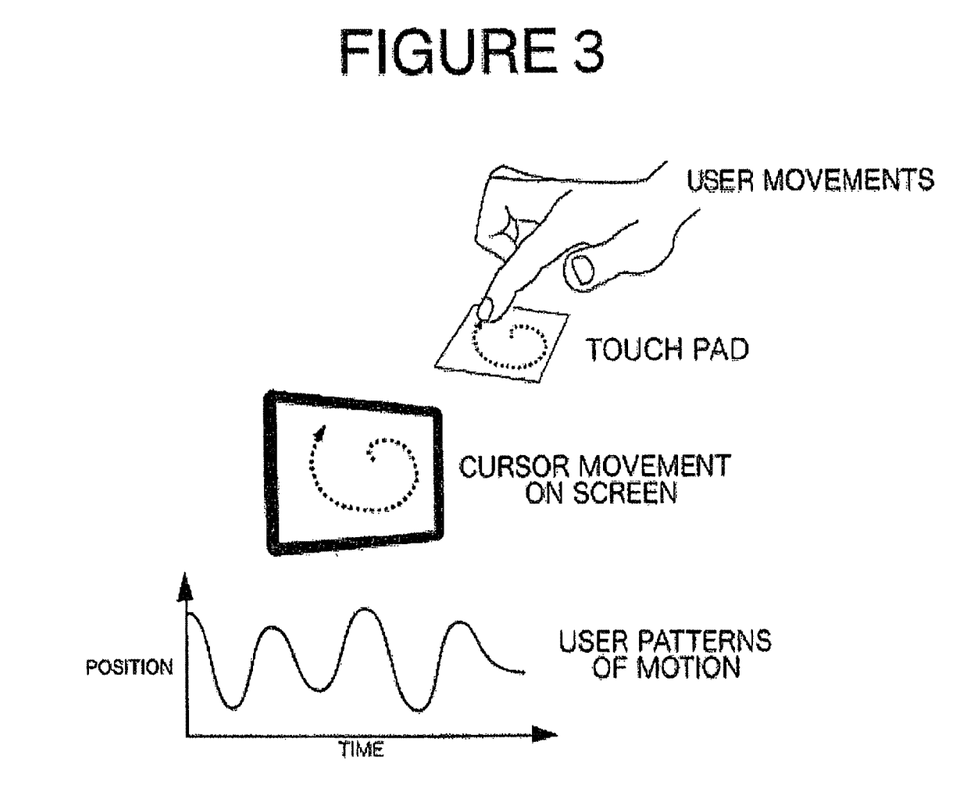
FIG. 3 — The top illustration in FIG. 3 shows the motion of a computer user's finger on a touchpad being used as an input device. The middle illustration in FIG. 3 indicates the movements of a cursor on the computer's monitor which are caused by the user's finger movements in the top illustration. The bottom illustration in FIG. 3 presents a graphical representation of the the user's motion on the touch pad over time.

Because the method revealed here is more dependent on patterns of motion (body movements as well as facial expressions) and less dependent on the accurate measurement of endpoints, a simple mouse or touchpad can provide useful emotive data, (FIG. 3). The java script code in the appendix of this disclosure extracts emotive data from the user in this way.

This mouse or touchpad typically extracts rational user decisions, as determined from the position of the cursor on the screen. To extract emotive, rather than rational, information from the user, the current method calculates kinetic factors including velocity of cursor movement, steadiness of path, periodicity of movements, attack, and decay, which reveal instinctive behavioral patterns within the user's movements. These patterns of user behavior represent the output of the highly complex jumble of interlinked physiological oscillators within the user.

Figure 4:
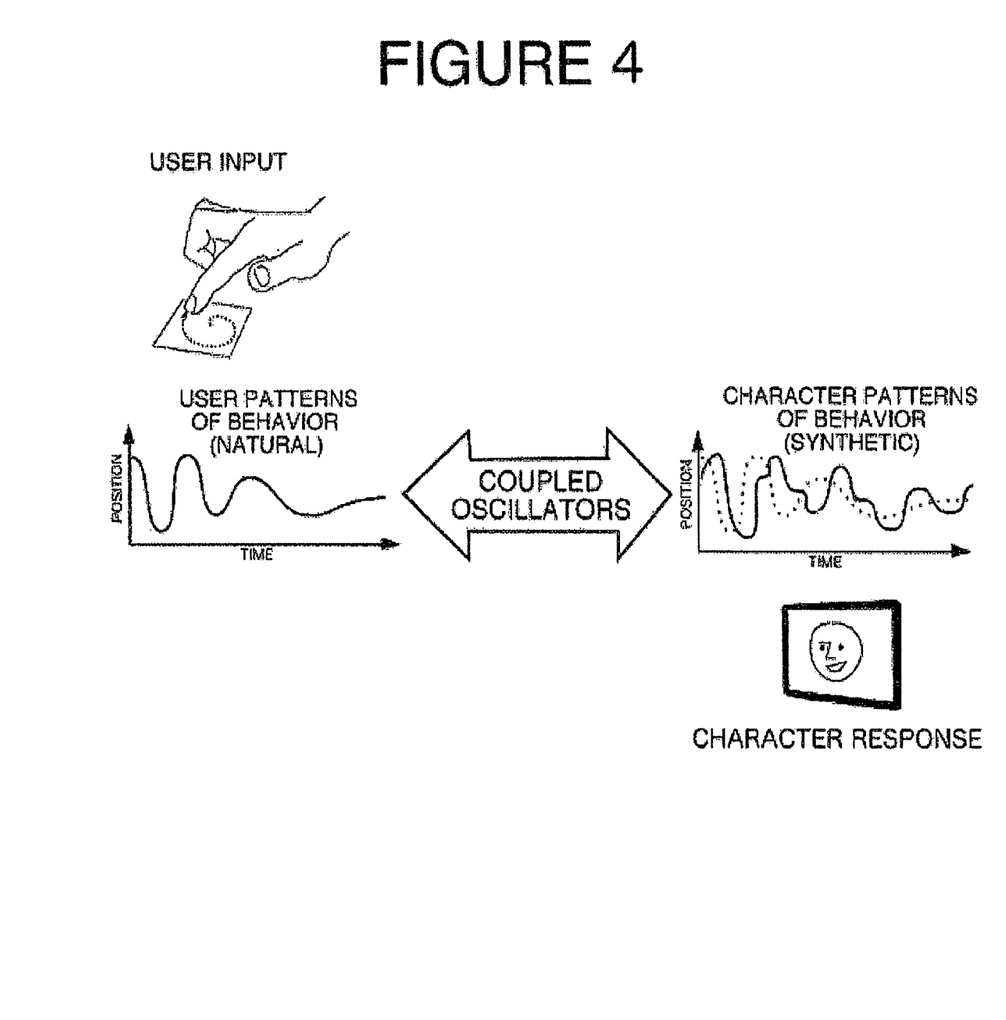
FIG. 4 — The left side of FIG. 4 shows the user's input being graphically represented as position verses time (as described in FIG. 3). The right side of FIG. 4 shows the graph of the output of a mathematical oscillator equation, when that equation is subjected to coupling (as shown in FIG. 2) with the motion of the user (as shown on the left of this FIG. 4).

The interlinked synthetic oscillators, which drive the behavior of the artificial character in the current method, create a dynamical system that is far simpler than the user's PDB's. Despite this difference in complexity and the software/wetware gap, these vastly different dynamical systems can be coupled by using the patterns of behavior the interface measures in the user to drive the synthetic oscillators of the character, (FIG. 4).

Furthermore, once these highly divergent systems are coupled, characteristic behaviors of coupled oscillators emerge, including those described above. In the simplest form of coupling, the patterns of motion coming from the user become a primary root for the hierarchy PBD equations in the character, as described above. This allows for phenomenon, including frequency entrainment and harmonic resonances, to create complex patterns of behavior in the artificial character in response to the user. These complex responses by the artificial character include emotional progressions and apparent willful actions which can be generally recognizable and repeatable enough to "make sense" to a human observer, and yet (being non-deterministic) are different every time. As a result, these responses feel more natural, and less mechanical.

This method also enables changing the nature of the artificial character's response to the user in a manner independent of the user's input. Different responses can be created independently by parametrically tuning the natural resonances of the artificial character's oscillators to reflect, amplify or contrast the patterned behavior measured from the user. The java script code presented in the appendix of this disclosure uses this method to alter the responses of a virtual infant as described below.

The parameter "awake", introduced in Step 3, affects the spring constant and the damping of springs that control the baby's behavior, including emotional responses, apparent willful actions, and physiological behaviors such as breathing. As "awake" approaches zero, it lowers the spring constant (slow acceleration) and increases the damping (resistance) of all these springs. As result, the baby appears to become drowsy as its responses are slowed and dulled until they reach the point where they no longer respond at all to the linked motions coming from the user interface, and the baby appears to fall asleep.

At the opposite end of the emotional spectrum, another broadly-applied parameter introduced in Step 3, "excitement" can raise the strength of these springs and drop their damping beyond their normal range. When this happens, the baby's responses become hyper (super-quick spring) and can be made to spiral out of control (negative resistance).

Step #6—Add Verbal and Rational Behaviors

Now that we have coupled the synthetic oscillators of our character to the organic oscillators of the user, our character can appear to reflect and respond to the user's emotional state. The next step is to augment this emotion-centric system so that it can generate adult verbal behavior. At this point we re-introduce the Stored Interactivity method.

When the character being animated is an adult, the method described here can run simultaneously with Stored Interactivity methods, such as those already known in the art which account for speech and other "higher" thought processes in current game characters and conversational agents.

Moreover, the PDB's modeled in this process may be used to moderate and control the "higher" processes being presented by the Stored Interactivity partner in this alliance. Mechanisms for achieving this control include using the emerging patterns of motion described in Steps 4 and 5 above as 'triggers' to initiate mood-appropriate Stored Interactivity sequences.

Other mechanisms for linking the two methods include a hierarchical structure which assigns the artificial emotions of this invention's spontaneous animation the role of parent, and any artificial intelligence method the role of child. One might argue that the validity of slaving artificial intelligence to artificial emotions in modeling human behavior is quickly confirmed by a casual observation of world history. But that, of course, would be outside the scope of this disclosure.

What this disclosure does reveal is the creation of entertaining and dramatic interactive characters by slaving methods depicting the "higher" and more "rational" human behaviors to the more "emotional" Physiologically-Based Behaviors, rather than the other way around.

What is claimed is:

1. A method of creating apparent emotions or moods in a computer-controlled artificial character or robot using a computer or a computer-controlled device, the method comprising:

(a) using one or more processors to select one or more variable oscillator mathematical formulas/equations, where each of these generate an adjustable oscillation which is controlled by changing a value of one or more parameter contained within the variable oscillator mathematical formulas/equations, in the manner of a spring equation which calculates the motion of a virtual spring, wherein the parameter known as a spring constant, k, determines the virtual spring's strength, and therefore the virtual spring's speed of oscillation, or bouncing back and forth, and wherein the additional parameter, known as damping, d, determines the rapidity with which the virtual spring ceases bouncing and comes to rest; creating one or more of an array of Physiological derived behaviors (PDB) using the Variable oscillator mathematical formulas/equations;

(b) running the one or more variable oscillator mathematical formulas/equations on the one or more processors of a computer, whereby each of the variable oscillator mathematical formulas/equations is calculating a numerical output in real time, in the manner in which the spring equation calculates the numerical output which represents the displacement of the virtual spring being modeled;

(c) Sending the numerical output of the one or more mathematical equations from the one or more computer processors and receiving the numerical output into the one or more processors of the computer controlled artificial character (artificial character) or robot, which affects some element of a behavior of the artificial character or the robot; in the case of the artificial character, the numerical output is sent to a display where the artificial character is shown to a user; in the case of the robot, the numerical output is imported into the one or more processors which modifies the position or sound of the robot; the one or more processors manipulates the robot or the artificial character in one or more of the following manners:

Facial Expression—in the case of the artificial character, the numerical output (derived within the computer processor) is applied to the artificial character controls running within the processor that modify the artificial character's face; in the case of the robot, the numerical output regulates the devices that deform the robot's face to show emotion;

Body Movements—in the case of the artificial character, the numerical output is applied to the artificial character controls running within the processor that modify a degree of one or more body movements, whereas, in the case of the robot, the numerical output regulates the degree of the mechanical manipulation of the robot;

Vocal Patterns—the numerical output produced by the processor is applied within a device modifying characteristics of an artificial voice to control one or more of the following: the artificial voice's pitch, the artificial voice's volume, the rate at which the artificial voice is speaking via separate oscillators;

(f) using one or more of a sensing device while the user is interacting with the computer generated artificial character, computer-controlled device or robot to measure natural patterns of the user's behavior which resemble the variable oscillation mathematical equations/formulas which generate an adjustable oscillation, whereby the sensing devices including one or more of the following:

A Touchpad—used to record patterns of user input which reflect emotional state, such as fast jittery movements, or slow sluggish movement;

A User-Facing Camera—used in combination with computer vision software to extract the user's facial expression, as well as the user's movements;

(g) transmitting the natural patterns of the user's behavior measured by the sensing device to the one or more computer processor;

(h) mathematically linking, via the one or more computer processors, the natural patterns of the user's behavior to the Variable oscillation mathematical equations/formulas which generate adjustable oscillations, in the manner of coupled oscillators, whereby patterns and apparent moods induced in the artificial character or robot appear to mirror changing moods of the user as sensed by one or more of the sensing devices.

2. The method of claim 1, further comprising:

i) creating via one or more processors on a computer which runs a separate non-transitory computer program on a computer readable medium, which generates independent calculations of one or more of the parameters within the variable oscillator equations running on the one or more computer processors;

(j) Feeding back the independent calculations of one or more of the parameters into the variable oscillator mathematical equations/formulas being run on the one or more computer processors.

* * * * *